Patented Jan. 2, 1934

1,942,177

UNITED STATES PATENT OFFICE 1,942,177

PROCESS FOR RECOVERING ALKALOIDS FROM COCOA PRODUCTS

Max Luthy, St. Louis, Mo., assignor, by mesne assignments, to Monsanto Chemical Company, a corporation of Delaware No Drawing. Application April 21, 1930, Serial No. 446,184, and in Great Britain November 7, 1929

7 Claims. (Cl. 87—28)

This invention relates to the recovery of alkaloids from cocoa products, such as cocoa press cake, cocoa expeller cake and defatted cocoa waste and it has particular application to the separation and purification of the alkaloids, the present application being a continuation in part of application, Serial Number 221,613 filed September 23, 1927. One of the principal objects of this invention is to provide an inexpensive and easily controlled process for recovering relatively pure alkaloids from cocoa products.

Briefly stated the process consists in subjecting a cocoa product, such as cocoa press cake or expeller cake, to a treatment with a suitable mineral acid which will change the texture of the cocoa product in such a way as to render it easily filterable and to liberate that part of the theobromine which is present in the cocoa product as glucoside or other complex compounds, then extracting the alkaloids from the cocoa material by means of an aqueous suspension of alkaline earth metal oxide or hydroxide or other suitable basic substances. Subsequently separating the insoluble material from the solution containing the theobromine and caffein and thereafter recovering the theobromine and caffein from the filtrate, preferably by means of a precipitating agent which in addition is capable of bleaching the product.

The acid treatment used to change the texture of the cocoa material and liberate part of the theobromine is preferably effected by subjecting the cocoa material to the action of a suitable mineral acid or mineral acid anhydrides, such, for example, as sulphuric acid, hydrochloric acid, phosphoric acid or sulphur dioxide, preferably at or near the boiling temperature of water. If desired, however, the acid treatment can be carried out at higher temperatures under pressure. By this step of the process the slimy or colloidal material of the cocoa product is coagulated or changed in such a way that the solid particles of the cocoa material will separate readily from the water that contains the alkaloids, thereby permitting the use of filters to separate the sludge from the extract, due to the fact that the suspension will filter readily.

The extractant step of the process can be performed conveniently by mixing the acid treated cocoa material with a sufficient quantity of lime to neutralize the acid left in the cocoa from the previous acid treatment, and also the theobromine contained in the cocoa, which react as acids to form calcium salts. This procedure yields a suspension which filters rapidly. If desired the amount of lime or other alkaline earth metal oxides or hydroxides that is added to the acid treated cocoa product can be so regulated that there is just sufficient basic material present to neutralize all the acid but not to form a salt of the theobromine. When such a procedure is used the extraction of the alkaloids is made with water alone, maintained near the boiling point of the water. The theobromine is sufficiently soluble to insure its extraction from the cocoa material. Another method of performing the extraction step of this process involves the addition of sufficient lime or other alkaline earth metal oxides or hydroxides to neutralize the acid in the cocoa and then dissolving out the alkaloids with weak bases, such for example as ammonium hydroxide or similar basic compounds that are capable of forming a water soluble salt with theobromine without affecting the rapid filtration of the suspension of cocoa. Caustic alkalies, such for example as sodium hydroxide, are not well adapted for use in this process on account of their deleterious action on cocoa materials. Although alkaline earth metal oxides or hydroxides are preferred other basic materials may be used in this step of the process, provided they are such in character that they will neutralize the acidic product of the cocoa material and form a filterable suspension with the solution of the alkaloid or alkaloid salt.

The next step of the process consists in separating the solids from the liquid which contains theobromine and caffein. This is effected preferably by filtration. The extracts obtained contain the theobromine either as a salt or as the free alkaloid, depending upon the precise quantity of alkaline earth metal oxide or hydroxide employed.

Any preferred procedure may be used to recover the theobromine. One method involves cooling the filtrate whereby the theobromine crystallizes. If the extraction has been conducted in an alkaline solution most of the alkaloids will be present as salts which are recovered by neutralizing the extractant with a substance or substances capable of combining with the alkaline earth metal thereby liberating the alkaloid. One procedure which is especially suited to the recovery of theobromine of good quality consists in neutralizing the alkalinity of the extractant and treating the calcium salt of theobromine with carbon dioxide at a temperature between 80° C. and 100° C., thereby precipitating a finely divided calcium carbonate which then absorbs the impurities present in the mixture.

After filtering the precipitated calcium carbonate a theobromine of excellent quality will crystallize upon cooling the solution. In lieu of the carbon dioxide one may add sodium carbonate to the extract which will react with the alkaloid salts to form calcium carbonate and the corresponding alkaloid salts. The calcium carbonate is precipitated and filtered in a similar manner and the filtrate acidified in order to liberate the alkaloid from the alkaloid salts.

An alkaloid of particularly pure quality is obtained by liberating the same from its salt with sulphur dioxide or sodium acid sulphite. Such materials tend to decolorize or bleach the theobromine and result in a product of distinctly superior quality.

The foregoing general description of the process sets forth the essential characteristics of my process. When the process is practiced on a commercial scale, it is customary to treat the filter cake constituting the residue of the extraction step so as to obtain a practically complete recovery of the alkaloids. This can be accomplished conveniently by washing the filter cake with water or a dilute solution from the process, then repulping the filter cake with water, and thereafter heating and filtering the suspension. It is also customary to further treat the filtrate from which the crystallized theobromine is recovered, hereinafter referred to as the first filtrate, so as to obtain a second crop of theobromine, this being effected by evaporating said filtrate to about one-fifth of its volume, and then cooling it, whereupon a second crop of theobromine will be obtained. This second crop is filtered off and the second filtrate may be used for the recovery of caffein by extraction, for instance, with organic solvents.

Usually, the extracted solution, which contains valuable fertilizer constituents, will be mixed with the extracted filter cake. The wet material can be used directly as a fertilizer or cattle food. The drying is done advantageously by exposing the wet material to flue gases containing carbon dioxide or other acidic compounds which neutralize the free lime contained in the cake.

The second crop of theobromine is usually rather impure, but it can be purified easily by first dissolving the crude theobromine in water as the calcium or other alkaline earth metal salt, filtering the solution and precipitating and liberating the theobromine from the filtrate by acidification. Instead of filtering the solution the calcium or other alkaline earth metal salt can be treated with sodium carbonate thereby forming the alkali salt of theobromine and a suspension of the calcium or other alkaline earth metal carbonate which is separated by filtration. The filtrate is acidified with sulphur dioxide, sodium acid sulfite or other acid bleaching agents whereby the alkaloid separates from solution.

The following example sets forth a procedure I prefer to use in practicing the invention, but it is to be understood that this procedure can be modified without departing from the spirit of this invention.

*Example.*—100 lbs. of cocoa product, such, for instance, as cocoa press cake, or expeller cake or defatted cocoa waste, is mixed with 25 gallons of water and 14 lbs. 20° Baumé hydrochloric acid and then heated with live steam to a temperature near the boiling temperature, for example, a temperature near 100° C. If the acid used is insufficient to maintain an acid reaction, more acid is added. The batch is kept at or near the boiling point for 5-6 hours and is then diluted to a total volume of 85-90 gallons with water. Hydrated lime is then added to neutralize the acid and acid products of the cocoa until the batch shows a slight alkalinity. About 20 lbs. of hydrated lime are required. After stirring for about 30 minutes the batch is filtered, thereby obtaining a filter cake composed of the solid particles of the cocoa material, and a filtrate (referred to as the first filtrate) that contains the cocoa alkaloids.

The theobromine is recovered from said first filtrate or extract by acidifying with an acid for example carbon dioxide gas. If carbon dioxide is used, the extract is preferably filtered at boiling temperature to avoid crystallization of theobromine with the calcium carbonate precipitate. The filtrate is cooled, whereby the theobromine crystallizes out.

The filter cake constituting the solid residue of the extraction step of the process is washed with about 15 gallons of warm water and is then made up with fresh water to the original volume of 85-90 gallons. Thereafter, this solution or suspension is filtered so as to recover any alkaloids that remain in the filter cake, the filtrate of this operation being retained for subsequent use in making up the next batch of filter cake that is treated. The filtrate from which the crystallized theobromine is recovered is evaporated to about one-fifth of its volume and it is then cooled so as to yield a second crop of theobromine. The second filtrate constituting the residue of this operation may be extracted with benzol or other suitable solvents to recover the caffein and may then be mixed with the extracted filter cake and used either directly or after drying as a cattle food or fertilizer.

When an alkaloid which is particularly light in color is desired a water solution of the alkaline earth metal salt of theobromine or the alkaline metal salt of theobromine (preferably the latter) is treated with a sulphur dioxide containing acidifying agent such as sulphur dioxide gas or sodium acid sulphite whereby the theobromine is liberated as a practically colorless precipitate.

It is convenient to obtain a practically colorless product by the process described hereinabove, by neutralizing the filtrate containing the alkali metal salt of theobromine with sulphur dioxide and subsequently separating the precipitated bleached product in the usual manner. Sufficient sulphur dioxide should be employed for the solution to attain a pH value of 8.2–8.4.

What I claim is:

1. In a process for refining theobromine obtained by the extraction thereof from cocoa waste products, the steps which include forming an aqueous solution of an alkaline earth metal salt of theobromine, thereafter converting said salt into the alkali metal salt by means of alkali metal carbonate, filtering the precipitated metal carbonate and liberating the purified theobromine from the filtrate by acidifying with sulphur dioxide containing acidifying agent.

2. In a process of extracting theobromine from cocoa products, the step which accomplishes the purification of theobromine by forming first an aqueous solution of the alkaline earth metal salt in water, thereafter converting said salt into the alkali metal salt by the action of akali carbonate, filtering off the precipitated alkaline earth metal carbonate and liberating the theobromine from the filtrate by acidifying with sulphur dioxide.

3. In a process wherein theobromine is recovered from cocoa products by means of at least one of the following: an alkaline earth metal oxide, and an alkaline earth metal hydroxide which forms a water soluble salt of theobromine, the steps in the recovering and refining of theobromine from the water soluble products thus obtained which include separating the theobromine salt as an aqueous solution from the insoluble cocoa residue, precipitating the free dissolved alkaline earth hydroxide by means of carbon dioxide thereby producing a carbonate precipitate having a purifying absorptive action on impurities in the aqueous solution, adding an alkali metal carbonate whereby the corresponding alkali metal salt of theobromine is formed, separating the insoluble matter from the aqueous solution, and liberating theobromine by means of an acid.

4. In the recovery of theobromine from cocoa products, the steps which include forming an aqueous solution of an alkaline earth metal salt of theobromine containing an excess of dissolved alkaline earth metal hydroxide, precipitating the excess hydroxide by means of carbon dioxide, forming the alkali metal salt of the theobromine by adding an alkali metal carbonate to the mixture and filtering the precipitated suspended matter from the solution of the alkali salt of theobromine.

5. The process as defined in claim 4 and further characterized in that the theobromine is liberated from the alkali metal salt by the addition of acid and thereafter is recovered from the aqueous medium by crystallization.

6. In a process for refining theobromine obtained by the recovery thereof from cocoa waste products, the steps which include forming an aqueous solution of an alkaline earth metal salt of theobromine converting said salt into the corresponding alkali metal salt by the addition of an alkali metal carbonate, separating the precipitated carbonate and finally liberating theobromine from the akali metal salt of theobromine by the addition of acid.

7. The process as defined in claim 6 and further characterized in that the acid is sulphur dioxide.

MAX LUTHY.

CERTIFICATE OF CORRECTION.

Patent No. 1,942,177.            January 2, 1934.

MAX LUTHY.

It is hereby certified that error appears in the printed specification of the above numbered patent requiring correction as follows: Page 2, line 115-116, for "alkaline" read alkali; and that the said Letters Patent should be read with this correction therein that the same may conform to the record of the case in the Patent Office.

Signed and sealed this 11th day of September, A. D. 1934.

Leslie Frazer (Seal)            Acting Commissioner of Patents.

3. In a process wherein theobromine is recovered from cocoa products by means of at least one of the following: an alkaline earth metal oxide, and an alkaline earth metal hydroxide which forms a water soluble salt of theobromine, the steps in the recovering and refining of theobromine from the water soluble products thus obtained which include separating the theobromine salt as an aqueous solution from the insoluble cocoa residue, precipitating the free dissolved alkaline earth hydroxide by means of carbon dioxide thereby producing a carbonate precipitate having a purifying absorptive action on impurities in the aqueous solution, adding an alkali metal carbonate whereby the corresponding alkali metal salt of theobromine is formed, separating the insoluble matter from the aqueous solution, and liberating theobromine by means of an acid.

4. In the recovery of theobromine from cocoa products, the steps which include forming an aqueous solution of an alkaline earth metal salt of theobromine containing an excess of dissolved alkaline earth metal hydroxide, precipitating the excess hydroxide by means of carbon dioxide, forming the alkali metal salt of the theobromine by adding an alkali metal carbonate to the mixture and filtering the precipitated suspended matter from the solution of the alkali salt of theobromine.

5. The process as defined in claim 4 and further characterized in that the theobromine is liberated from the alkali metal salt by the addition of acid and thereafter is recovered from the aqueous medium by crystallization.

6. In a process for refining theobromine obtained by the recovery thereof from cocoa waste products, the steps which include forming an aqueous solution of an alkaline earth metal salt of theobromine converting said salt into the corresponding alkali metal salt by the addition of an alkali metal carbonate, separating the precipitated carbonate and finally liberating theobromine from the akali metal salt of theobromine by the addition of acid.

7. The process as defined in claim 6 and further characterized in that the acid is sulphur dioxide.

MAX LUTHY.

CERTIFICATE OF CORRECTION.

Patent No. 1,942,177.   January 2, 1934.

MAX LUTHY.

It is hereby certified that error appears in the printed specification of the above numbered patent requiring correction as follows: Page 2, line 115-116, for "alkaline" read alkali; and that the said Letters Patent should be read with this correction therein that the same may conform to the record of the case in the Patent Office.

Signed and sealed this 11th day of September, A. D. 1934.

Leslie Frazer (Seal)   Acting Commissioner of Patents.